United States Patent
Le et al.

(10) Patent No.: US 10,108,542 B2
(45) Date of Patent: Oct. 23, 2018

(54) SERIAL LINK STORAGE INTERFACE (SLSI) HYBRID BLOCK STORAGE

(71) Applicant: Avalanche Technology, Inc., Fremont, CA (US)

(72) Inventors: Ngon Van Le, Fremont, CA (US); Berhanu Iman, Sunnyvale, CA (US); Ravishankar Tadepalli, Fremont, CA (US)

(73) Assignee: Avalanche Technology, Inc., Fremont, CA (US)

(*) Notice: Subject to any disclaimer, the term of this patent is extended or adjusted under 35 U.S.C. 154(b) by 28 days.

(21) Appl. No.: 15/383,899

(22) Filed: Dec. 19, 2016

(65) Prior Publication Data

US 2017/0192679 A1    Jul. 6, 2017

Related U.S. Application Data

(60) Provisional application No. 62/274,626, filed on Jan. 4, 2016.

(51) Int. Cl.
| | |
|---|---|
| *G06F 3/06* | (2006.01) |
| *G06F 13/16* | (2006.01) |
| *G06F 12/02* | (2006.01) |
| *G06F 12/06* | (2006.01) |

(52) U.S. Cl.
CPC ........ *G06F 12/0246* (2013.01); *G06F 3/0685* (2013.01); *G06F 12/0638* (2013.01); *G06F 13/1668* (2013.01); *G06F 13/16* (2013.01); *G06F 2212/1052* (2013.01); *G06F 2212/7208* (2013.01)

(58) Field of Classification Search
CPC .... G06F 3/0611; G06F 3/0683; G06F 3/0685; G06F 13/1668; G06F 13/1694
See application file for complete search history.

(56) References Cited

U.S. PATENT DOCUMENTS

| | | | |
|---|---|---|---|
| 6,226,723 B1* | 5/2001 | Gustavson | G11C 7/10 711/154 |
| 8,185,685 B2 | 5/2012 | Selinger | |
| 9,460,791 B1* | 10/2016 | Shallal | G11C 29/028 |
| 2006/0095592 A1* | 5/2006 | Borkenhagen | G06F 13/1673 710/2 |
| 2006/0095646 A1* | 5/2006 | Gower | G06F 13/1684 711/100 |
| 2008/0082750 A1* | 4/2008 | Okin | G11C 5/04 711/115 |
| 2009/0254689 A1* | 10/2009 | Karamcheti | G06F 12/0246 710/301 |

(Continued)

*Primary Examiner* — Hal Schnee
(74) *Attorney, Agent, or Firm* — Bing K. Yen (57) ABSTRACT

The present invention is directed to a computer subsystem that includes a central processing unit (CPU); one or more byte-addressable memory modules having a dual in-line memory module (DIMM) form factor connected to the CPU via a first memory channel; and a master persistent memory module and one or more slave persistent memory modules having the DIMM form factor connected to the CPU via a second memory channel. The master persistent memory module and the one or more slave persistent memory modules are connected in a daisy chain configuration. The one or more slave persistent memory modules receive commands directly from the master persistent memory module.

16 Claims, 5 Drawing Sheets

(56) References Cited

U.S. PATENT DOCUMENTS

| | | | |
|---|---|---|---|
| 2010/0005218 A1* | 1/2010 | Gower | G06F 13/4234 |
| | | | 711/5 |
| 2010/0174955 A1* | 7/2010 | Carnevale | G11C 5/04 |
| | | | 714/718 |
| 2013/0086311 A1 | 4/2013 | Huang et al. | |
| 2013/0304980 A1* | 11/2013 | Nachimuthu | G06F 12/0246 |
| | | | 711/103 |
| 2014/0013036 A1* | 1/2014 | Kwon | G11C 11/40615 |
| | | | 711/103 |
| 2014/0071744 A1* | 3/2014 | Lee | G11C 11/1673 |
| | | | 365/158 |
| 2014/0101370 A1 | 4/2014 | Chu et al. | |
| 2015/0255130 A1 | 9/2015 | Lee et al. | |
| 2017/0212700 A1* | 7/2017 | Lee | G06F 3/0619 |
| 2017/0256291 A1* | 9/2017 | Lee | G11C 5/06 |
| 2018/0018006 A1* | 1/2018 | Kudo | G06F 1/206 |

* cited by examiner

SERIAL LINK STORAGE INTERFACE (SLSI) HYBRID BLOCK STORAGE

CROSS-REFERENCE TO RELATED APPLICATIONS

The present application claims the benefit of the provisional application bearing Ser. No. 62/274,626 filed Jan. 4, 2016, entitled "Serial Link Storage Interface (SLSI) Hybrid Block Storage."

BACKGROUND

The present invention relates to a data storage system, and more particularly, to a block-based storage system with low latency.

Non-volatile or persistent solid state memory, such as NAND Flash, is progressively replacing hard disk drives (HDDs) as the data storage device for computer systems. Unlike a random access memory (RAM) in which each byte can be independently accessed, a NAND Flash memory is divided into a series of blocks, which are the smallest erasable units in a NAND Flash device.

The NAND Flash memory, in the form of solid state drive (SSD), provides a drop-in replacement for slower HDDs by connecting to computer systems via Serial ATA (SATA) or Serial Attached SCSI (SAS) interface originally designed for HDDs. As the performance of the NAND Flash memory improves, however, the high latency of the SATA and SAS interfaces becomes a bottle neck, prompting the data storage industry to adopt potentially faster interfaces, such as peripheral component interconnect express (PCIe).

To further reduce the latency and increase the bandwidth of the interface, a persistent solid state memory like NAND Flash may, in principle, be connected to one or more central processing units (CPUs) via a system memory bus. Such implementation, however, faces several issues as will be discussed later.

Figure 1:
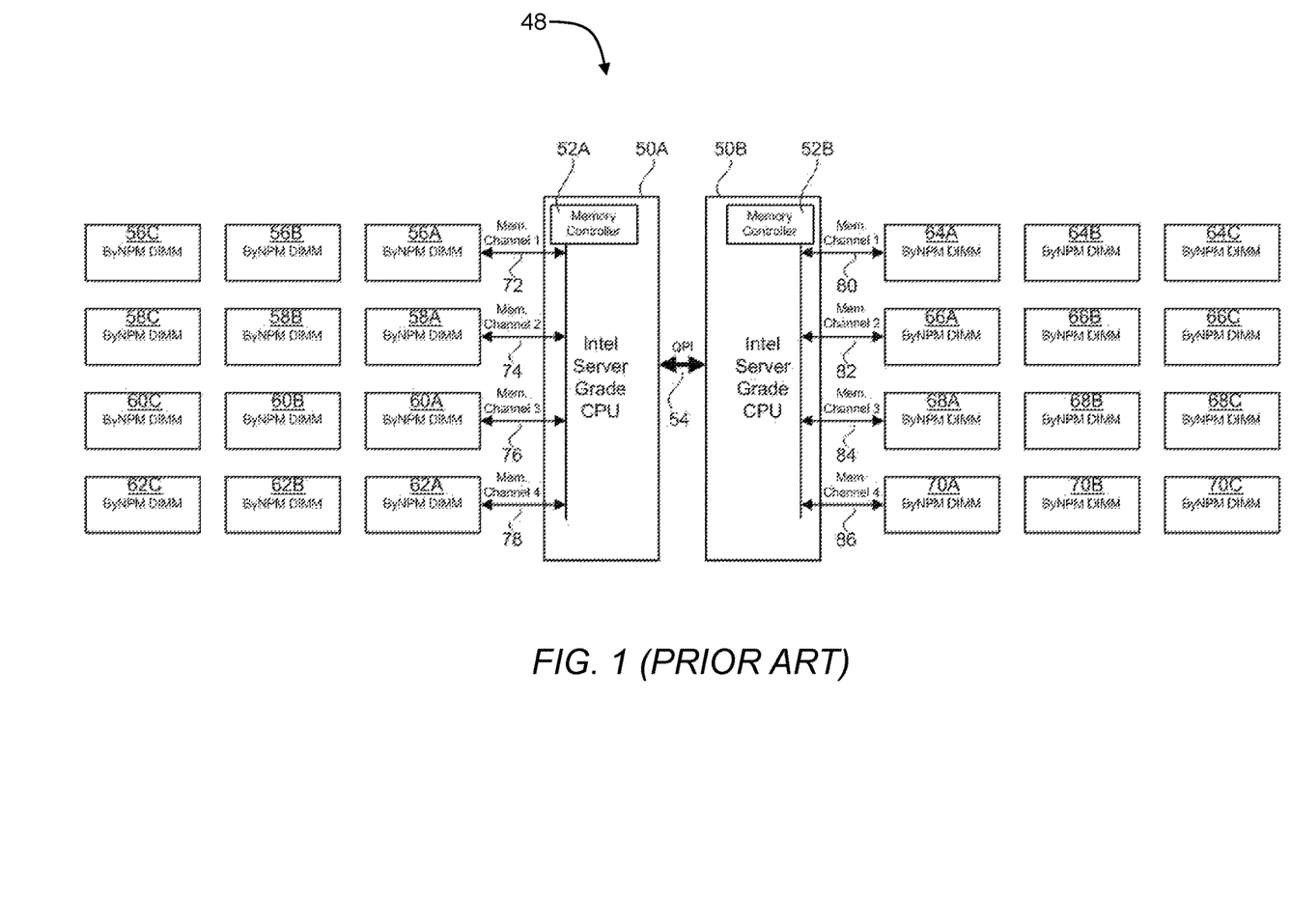
FIG. 1 is a block diagram of a conventional computer subsystem that includes multiple CPUs and non-persistent memory modules coupled thereto.

FIG. 1 shows a block diagram of a conventional computer subsystem 48 that includes multiple CPUs 50A and 50B and byte-addressable non-persistent memory (ByNPM) modules 56A/B/C-70A/B/C that reside in dual in-line memory module (DIMM) slots of a mother board. Unlike persistent memory, volatile or non-persistent memory, such as dynamic random access memory (DRAM), loses data stored therein when power is interrupted. The computer subsystem 48 of FIG. 1 includes two CPUs 50A and 50B communicating with each other through a high speed link or interconnect 54. Each of the CPUs 50A and 50B includes a respective one of memory controllers 52A and 52B, through which the CPUs 50A and 50B communicate with and manage the ByNPM modules 56A/B/C-70A/B/C. The memory controller 52A of the CPU 50A communicates with 12 ByNPM modules 56A/B/C-62A/B/C via four memory channels 72-78. Each of the four channels 72-78 is connected to respective three of the ByNPM modules 56A/B/C-62A/B/C. Similarly, the memory controller 52B of the CPU 50B communicates with 12 ByNPM modules 64A/B/C-70A/B/C via four memory channels 80-86. Each of the four channels 80-86 is connected to respective three of the ByNPM modules 64A/B/C-70A/B/C.

Most commercially available CPUs may support enough DIMMs for system memory but cannot support enough persistent memory via DIMM slots for data storage applications. For example, Xenon® E5-26XX processors manufactured by Intel Corporation, a family of CPUs that are commonly used in computer servers, can each support a maximum of only 12 DIMMs per CPU. However, the memory speed drops to 1600 MHz from 2133 MHz if all 12 DIMM slots are populated. Moreover, a Xenon® E5-26XX processor with 4 memory channels can only support a maximum of 8 logical ranks per channel. This means that only two quad-rank DIMMs may be used with each channel, which further limits the number of physical DIMMs that can be used with each CPU.

Information relevant to attempts to address these problems can be found in U.S. Pat. Nos. 8,185,685 and 9,158,636 and U.S. Patent Application Publication Nos. 2013/0086311 and 2014/0101370. However, each one of these references suffers from one or more of the following disadvantages: inadequate storage capacity and high latency.

For the foregoing reasons, there is a need for a persistent memory module or system that can communicate with a CPU via the memory bus to reduce latency while having enough capacity for data storage.

SUMMARY

The present invention is directed to a memory module or system that satisfies this need. A computer subsystem having features of the present invention includes a central processing unit (CPU); one or more byte-addressable memory modules having a dual in-line memory module (DIMM) form factor connected to the CPU via a first memory channel; and a master persistent memory module and one or more slave persistent memory modules having the DIMM form factor connected to the CPU via a second memory channel. The master persistent memory module and the one or more slave persistent memory modules are connected in a daisy chain configuration. The one or more slave persistent memory modules receive commands directly from the master persistent memory module.

According to another aspect of the present invention, a computer subsystem includes a central processing unit (CPU); one or more byte-addressable memory modules having a dual in-line memory module (DIMM) form factor connected to the CPU via a first memory channel; and one or more persistent memory modules having the DIMM form factor connected to the CPU via a second memory channel, each of the one or more persistent memory modules including a plurality of block-addressable persistent memory devices for storing data and a byte-addressable persistent memory device.

BRIEF DESCRIPTION OF THE DRAWINGS

These and other features, aspects, and advantages of the present invention will become better understood with regard to the following description, appended claims, and accompanying drawings where:

For purposes of clarity and brevity, like elements and components will bear the same designations and numbering throughout the Figures, which are not necessarily drawn to scale.

DESCRIPTION

Figure 2:
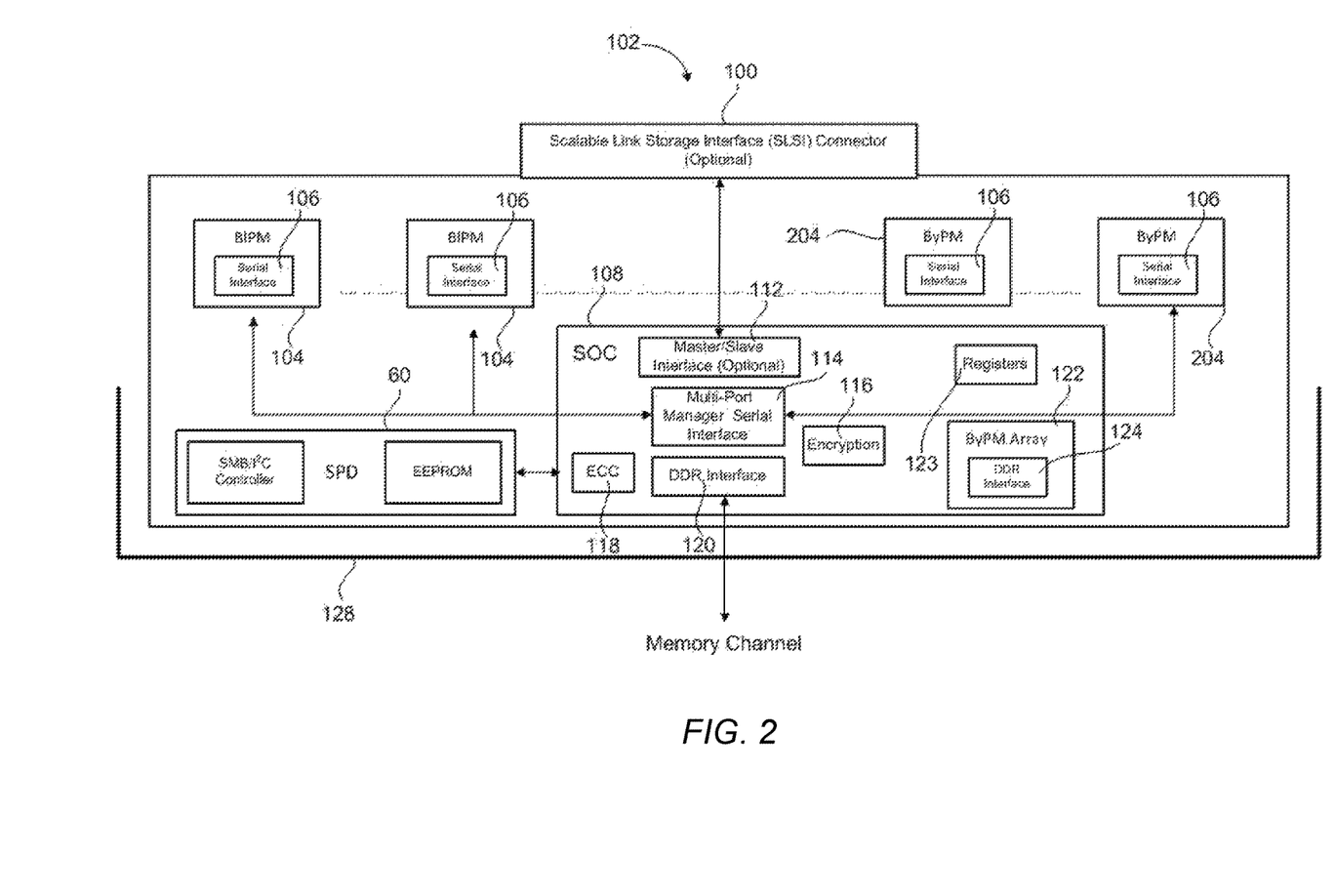
FIG. 2 is a block diagram illustrating a high level persistent memory module in accordance with an embodiment of the present invention.

An embodiment of the present invention as applied to a persistent memory module 102 will now be described with reference to FIG. 2. Referring now to FIG. 2, the memory module 102 may reside in a socket or slot 128 on a computer mother board and communicates with a CPU (not shown) via a memory channel. The slot 128 may have a DIMM form factor, such as but not limited to Dual In-line Memory Module (DIMM), Mini-DIMM, Register Dual In-Line Memory Module (RDIMM), Small Outline DIMM (SODIMM), or any other variant of DIMM form factor known in the art or to be developed in the future.

With continuing reference to FIG. 2, the persistent memory module 102 includes a plurality of block-addressable persistent memory (BlPM) devices 104 for storing data. The BlPM devices 104 may use any suitable persistent memory technology, such as but not limited to NAND Flash, magnetic memory, or phase change memory. Each of the BlPM devices 104 may include a respective one of a plurality of embedded serial interfaces 106 connecting to a controller 108, which may be in the form of a system-on-chip (SOC), on the memory module 102. The SOC 108 controls the data/command transmission between the memory module 102 and the CPU and includes a multi-port manager interface 114 that connects to the serial interfaces 104 of the BlPM devices 104 and a double data rate (DDR) interface that connects to the memory channel via the slot 128. The SOC 108 may include an encryption circuitry 116 for encrypting the stored data, an error correction code (ECC) circuitry 118 for data correction if needed, and a general purposed register 123. The memory module 102 may optionally include one or more byte-addressable persistent memory (ByPM) devices 204, each of which may include a respective one of the embedded serial interfaces 106 for connection to the SOC 108. Each of the byte-addressable persistent memory (ByPM) devices 204 may include multiple partitions with each partition being used for system memory or storing data.

The memory module 102 may further include therein a serial presence detect (SPD) device 60 and a persistent memory device 122 configured to have multiple memory partitions. One memory partition can be used as the main system memory for application execution. Other memory partitions can be used as read/write buffers to store data, system configurations, meta-data such as but not limited to logical to physical (L2P) tables, and journaling. The SPD device 60 identifies the persistent memory module 102 to the computer, especially during a power-on self-test (POST). The SPD device 60 may include an electrically erasable programmable read-only memory (EEPROM) that stores memory module configuration information, such as vendor ID, part number, serial number, memory timings, and other information about memory devices installed on the persistent memory module 102. The EEPROM may be accessed using a system management bus (SMB) or inter-integrated circuit (I²C) controller disposed on the persistent memory module 102.

Figure 3:
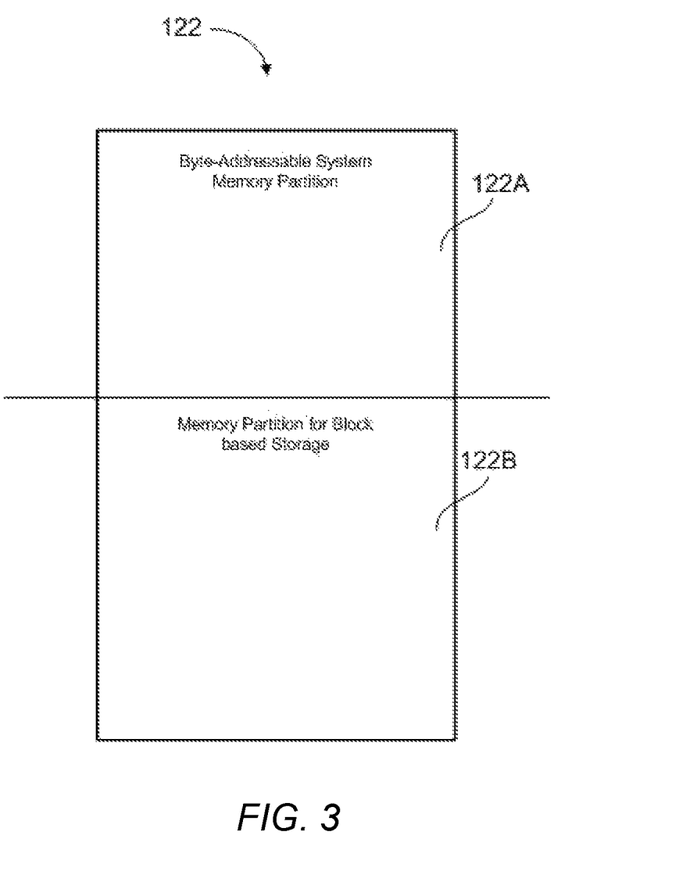
FIG. 3 is a schematic drawing illustrating partitioning of the persistent memory device on the memory module of FIG. 2.

The persistent memory device 122 may be embedded in the SOC 108 or a separate device that includes a DDR interface 124 that connects to the SOC 108. The persistent memory device 122 may include any suitable persistent memory, such as but not limited to magnetic random access memory (MRAM), spin-transfer torque magnetic random access memory (STT-MRAM), resistive random access memory (ReRAM), or phase change random access memory (PCRAM). The persistent memory device 122 may be configured to have multiple partitions as illustrated in FIG. 3. One of the partitions 122A may be configured as system memory and is byte-addressable. The system memory partition 122A is visible to the BIOS during system booting and to the OS during normal operation. At least one other partition 122B may be configured as block-based storage for read/write buffers, storing L2P tables, journaling, block management, storing data, and other applications. The block-based partition 122B may not be detected by the BIOS during system booting to prevent the content or data stored in the blocked-based partition 122B being initialized or erased. In an embodiment, the block-based partition 122B is not detected by the OS during normal operation. In an alternative embodiment, the block-based partition 122B is detected by the OS via a software driver.

With continuing reference to FIG. 2, the persistent memory module 102 may further include a scalable link storage interface (SLSI) connector 100 connected to a master/slave interface 112 in the SOC 108. The SLSI connector 100 enables the persistent memory module 102 to connect to other substantially identical memory modules to set up a master/slave configuration to be described later. The SLSI connector 100 may transmit and/or manipulate data, addresses, control signals and may include therein a high speed serial interface (not shown) that allows the signals to flow both ways. The master/slave configuration formed by linking multiple memory modules 102 via the SLSI connector 100 advantageously reduces workload and offloads data movement from the CPU by allowing the SOC 108 of the master memory module to perform management operations, such as but not limited to global garbage collection and global wear leveling for enhancing endurance and sustaining higher throughput.

Figure 4:
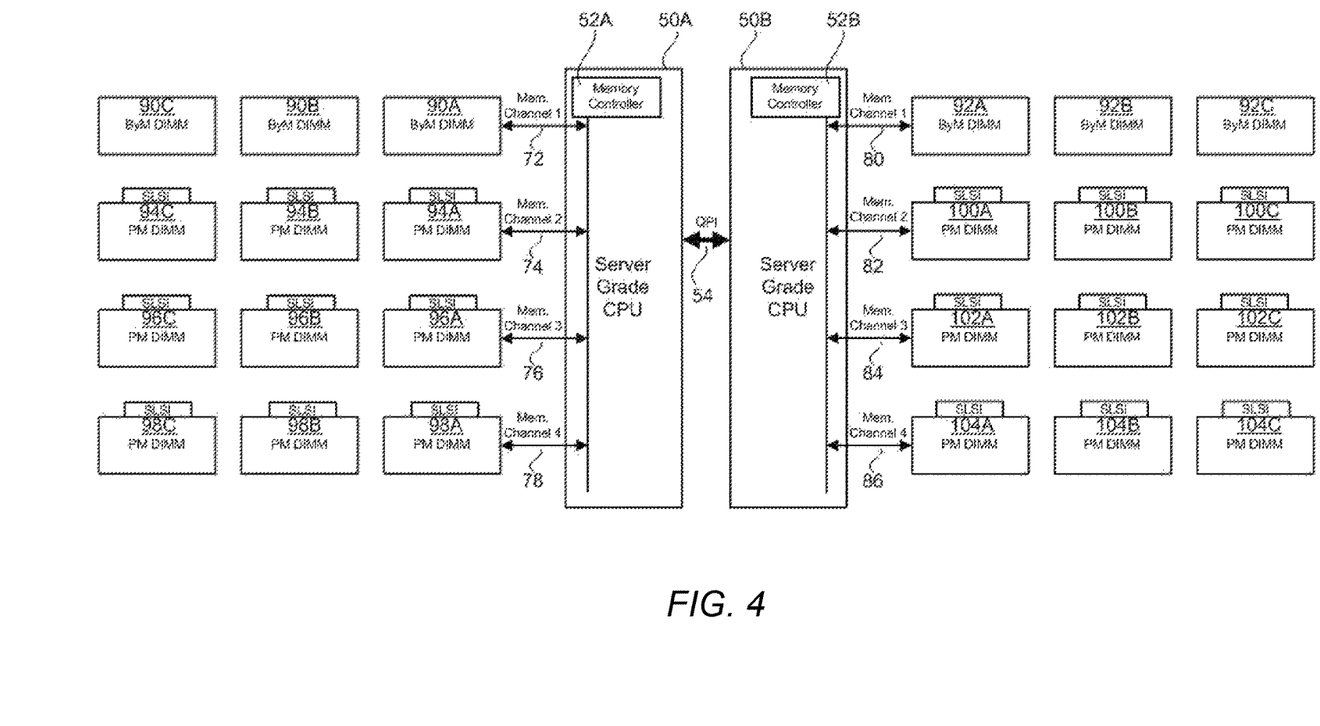
FIG. 4 is a block diagram illustrating a computer subsystem that includes multiple CPUs coupled to multiple persistent memory modules according to another embodiment of the present invention.

FIG. 4 is a block diagram illustrating an exemplary computer subsystem 88 that includes a CPU 50A coupled to byte-addressable memory modules 90A/B/C and persistent memory modules 94A/B/C-98A/B/C through memory channels 72-78, respectively, in accordance with another embodiment of the present invention. The CPU 50A includes one or more cores and may include a memory controller 52A that connects to the memory channels 72-78 and communicates with the memory modules 90A/B/C and 94A/B/C-98A/B/C, which may have any suitable DIMM form factor as described above. The byte-addressable memory modules 90A/B/C may utilize non-persistent memory, such as DRAM, and/or persistent memory, such as but not limited to MRAM, ReRAM, or PCRAM. Each of the memory channels 72-78 is a memory bus. Unlike system and peripheral buses such as PCI, PCIe, SATA, and SAS, the address of data transmitted through the memory bus is not translated and the address/data are not encapsulated into packets during transmission, thereby minimizing the latency between the CPU 50A and the memory modules 90A/B/C and 94A/B/C-98A/B/C. While FIG. 4 shows four memory channels 72-78 are connected to the CPU 50A, the CPU 50A may have as few as two memory channels connected thereto or as many as the CPU 50A can support or somewhere in between. Similarly, the exemplary figure shows that each channel is connected to three memory modules, but the number of memory modules connected to a channel may be more or less depending on the capability of the CPU 50A, the number of DIMM sockets, the number of slots available, or desired storage and memory capacity.

In an embodiment, at least one memory channel 72 is connected to one or more byte-addressable memory modules 90A/B/C, which serve as the main or system memory. At least one memory channel 74, 76, or 78 is connected to one or more persistent memory modules 94A/B/C-98A/B/C, which may serve as block-based storage. In another embodiment, each of the persistent memory modules 94A/B/C-98A/B/C has a substantially similar structure as the persistent memory module 102 illustrated in FIG. 2.

The exemplary computer subsystem 88 may further include one or more additional CPUs communicating with each other and/or the CPU 50A through high speed links or interconnects. FIG. 4 show a second CPU 50B, which directly communicates with the first CPU 50A through a high speed link or interconnect 54, being coupled to byte-addressable memory modules 92A/B/C and persistent memory modules 100A/B/C-104A/B/C through memory channels 80-86, respectively. Like the first CPU 50A, the second CPU 50B includes one or more cores and may include a second memory controller 52B that connects to the memory channels 80-86 and communicates with the memory modules 92A/B/C and 100A/B/C-104A/B/C, which may have any DIMM form factor as described above. The byte-addressable memory modules 92A/B/C may utilize non-persistent memory, such as DRAM, and/or persistent memory, such as but not limited to MRAM, ReRAM, or PCRAM. FIG. 4 shows the second CPU 50B being connected to the memory modules 92A/B/C and 100A/B/C-104A/B/C via four channels 80-86, but the CPU 50B may have any number of channels from two to as many as the CPU 50B can support with each channel being connected to one or more DIMM modules.

In an embodiment, at least one memory channel 80 is connected to one or more byte-addressable memory modules 92A/B/C, which, along with the byte-addressable memory modules 90A/B/C, serve as the main or system memory. At least one memory channel 82, 84, or 86 is connected to one or more persistent memory modules 100A/B/C-104A/B/C, which may serve as a part of block based storage. In another embodiment, each of the persistent memory modules 94A/B/C-104A/B/C has a substantially similar structure as the memory module 102 illustrated in FIG. 2.

The persistent memory modules 94A/B/C-104A/B/C may first configured as block-based storage and then operate in the physical block address (PBA) or logical block address (LBA) mode. In the PBA mode, the persistent memory modules 94A/B/C-104A/B/C receive physical addresses associated with the user data from the CPUs 50A and 50B. Not all portions of each of the persistent memory modules 94A/B/C-104A/B/C may be visible to the basic input/output system (BIOS) while the computer subsystem 88 is booting. For example, the system memory partition 122A of the persistent memory device 122 may be visible to the BIOS during system booting and to the OS during normal operation, while the block-based partition 122B of the persistent memory device 122 and the BlPM devices 104 may be invisible to the BIOS during system booting and may be detected by the OS via a software driver. The flash translation layer (FTL), which provides LBA to PBA translation, is stored in the system memory and executed by one or more system CPUs. Other block-based management operations, such as but not limited to global garbage collection (GGC) and global wear leveling (GWL), may also be handled by the system memory and one or more system CPUs.

In the LBA mode, the persistent memory modules 94A/B/C-104A/B/C receive logical addresses associated with the user data from the CPUs 50A and 50B. Not all portions of each of the persistent memory modules 94A/B/C-104A/B/C may be visible to the basic input/output system (BIOS) while the computer subsystem 88 is booting. For example, the system memory partition 122A of the persistent memory device 122 may be visible to the BIOS during system booting and to the OS during normal operation, while the block-based partition 122B of the persistent memory device 122 and the BlPM devices 104 may be invisible to the BIOS during system booting and may be detected by the OS via a software driver. The flash translation layer (FTL), which provides LBA to PBA translation, may be stored in the block-based partition 122B of the persistent memory modules 94A/B/C-104A/B/C and executed by the same modules. Other block-based management operations, such as but not limited to garbage collection (GC) and wear leveling (WL), may also be handled by the persistent memory modules 94A/B/C-104A/B/C.

Figure 5:
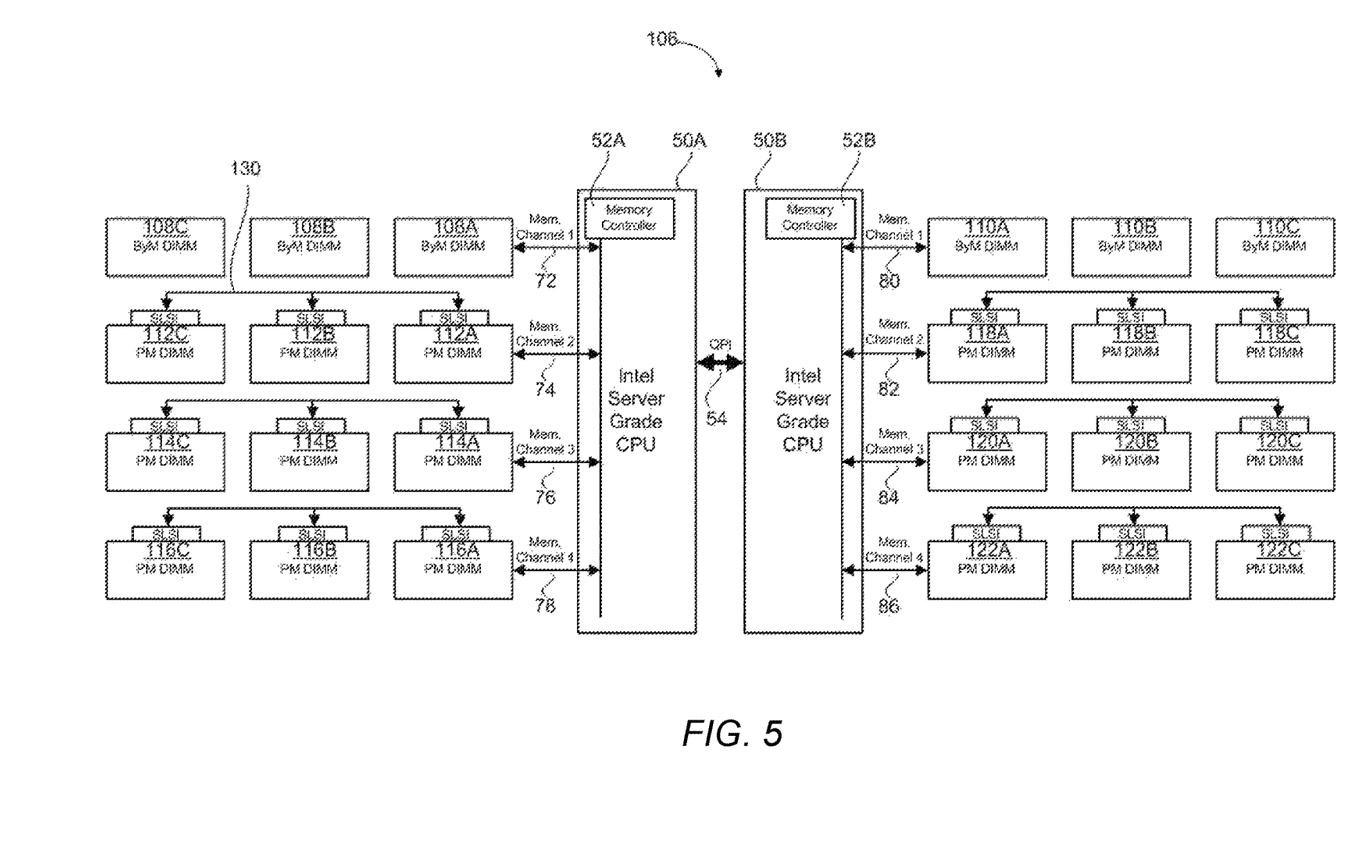
FIG. 5 is a block diagram illustrating a computer subsystem that includes multiple CPUs coupled to multiple persistent memory modules in daisy chain configuration according to still another embodiment of the present invention.

FIG. 5 is a block diagram illustrating an exemplary computer subsystem 106 that includes a CPU 50A coupled to byte-addressable memory modules 108A/B/C and persistent memory modules 112A/B/C-116A/B/C through memory channels 72-78, respectively, in accordance with another embodiment of the present invention. The CPU 50A includes one or more cores and may include a memory controller 52A that connects to the memory channels 72-78 and communicates with the memory modules 108A/B/C and 112A/B/C-116A/B/C, which may have any suitable DIMM form factor as described above. The persistent memory modules 112A/B/C-116A/B/C may have a structure substantially similar to that of the persistent memory module 102 as illustrated in FIG. 2 and described above. The computer subsystem 106 differs from the computer subsystem 88 of FIG. 4 in that the persistent memory modules 112A/B/C-116A/B/C operate in a master/slave configuration. Each of the channels 74-78 supports three persistent memory modules 112A/B/C, 114A/B/C, or 116A/B/C. One of the three persistent memory modules connected to each channel is configured as the master persistent memory module 112A, 114A, or 116A, while the other BlPM modules 112B/C-116B/C are configured as slave persistent memory modules.

The master persistent memory modules 112A-116A communicates with the CPU 50A or the memory controller 52A via the memory channels 74-78, respectively. The slave persistent memory modules 112B/C-116B/C receives commands from the respective master persistent memory modules 112A-116A thereof and send data to or receive data from the CPU 50A via the memory channels 74-78. The slave modules and the master module connected to a channel (e.g., 112A/B/C) are daisy chained using any suitable link 130, such as but not limited to a cable or built-in connectors in a printed circuit board (PCB), thereby allowing the slave persistent memory modules to communicate with the corresponding master persistent memory module. The byte-addressable memory modules 108A/B/C may be detected by the BIOS during system booting and the OS during normal operation while the master and slave persistent memory modules 112A/B/C-116A/B/C may be partially detected by the BIOS during system booting. In an embodiment, only a portion of the persistent memory modules 112A/B/C-116A/

B/C, such as the system memory partition 122A of the persistent memory device 122 on the memory module 102, is detected by the BIOS during system booting, while the block-based partition 122B of the persistent memory device 122 and the BlPM devices 104 may be invisible to the BIOS during system booting and may be detected by the OS via a software driver. The byte-addressable memory modules 108A/B/C and the persistent memory modules 112A/B/C-116A/B/C may have any suitable DIMM form factor as described above.

In the computer subsystem 106 of FIG. 5, the master persistent memory modules 112A-116A may handle all block-based management operations, such as but not limited to global garbage collection, flash translation layer, and global wear leveling for the corresponding slave persistent memory modules 112B/C-116B/C. Therefore, the master persistent memory modules 112A-116A receive logical block addresses associated with the user data from the CPU 50A or memory controller 52A and operate in a LBA mode.

Like the exemplary computer subsystem 88 of FIG. 4, the exemplary computer subsystem 106 may further include one or more additional CPUs communicating with each other and/or the CPU 50A through high speed links or interconnects. FIG. 5 show a second CPU 50B, which directly communicates with the first CPU 50A through a high speed link or interconnect 54, being coupled to byte-addressable memory modules 110A/B/C and persistent memory modules 118A/B/C-122A/B/C through memory channels 80-86, respectively. Like the first CPU 50A, the second CPU 50B includes one or more cores and may include a second memory controller 52B that connects to the memory channels 80-86 and communicates with the memory modules 110A/B/C and 118A/B/C-122A/B/C, which may have any suitable DIMM form factor as described above. Like the slave persistent memory modules 112B/C-116B/C, the slave persistent memory modules 118B/C-122B/C receives commands from their corresponding master persistent memory modules 118A-122A via the links 130.

It should be noted that while the exemplary computer subsystems 88 and 106 illustrated in FIGS. 4 and 5, respectively, have four memory channels connected to each CPU with each memory channel supporting three memory modules, the present invention may have any suitable number of memory channels connected to each CPU with any suitable number of memory modules connected to each memory channel. For example, the present invention may have at least one memory channel connected to one or more byte-addressable memory modules and at least one memory channel connected to one or more independent persistent memory modules. Alternatively, the present invention may have at least one memory channel connected to one or more byte-addressable memory modules and at least one memory channel connected to at least one or more master persistent memory modules and one or more slave persistent memory modules with at least one master persistent memory module connecting to at least one slave persistent memory module in a daisy chain configuration.

The previously described embodiments of the present invention have many advantages, including low latency and high capacity. It is important to note, however, that the invention does not require that all the advantageous features and all the advantages need to be incorporated into every embodiment of the present invention.

While the present invention has been shown and described with reference to certain preferred embodiments, it is to be understood that those skilled in the art will no doubt devise certain alterations and modifications thereto which nevertheless include the true spirit and scope of the present invention. Thus the scope of the invention should be determined by the appended claims and their legal equivalents, rather than by examples given.

What is claimed is:

1. A computer subsystem comprising:
a central processing unit (CPU);
one or more byte-addressable memory modules having a dual in-line memory module (DIMM) form factor and directly connected to said CPU via a first memory channel; and
a master and one or more slave persistent memory modules having said DIMM form factor and directly connected to said CPU via a second memory channel, wherein said master persistent memory module and said one or more slave persistent memory modules are connected in a daisy chain configuration by a serial link, said one or more slave persistent memory modules receive commands originated from said master persistent memory module.

2. The computer subsystem of claim 1, wherein each of said one or more byte-addressable memory modules includes dynamic random access memory (DRAM).

3. The computer subsystem of claim 1, wherein each of said one or more byte-addressable memory modules includes magnetic random access memory (MRAM).

4. The computer subsystem of claim 1, wherein said master persistent memory module includes a plurality of block-addressable persistent memory devices for storing data and a byte-addressable persistent memory device.

5. The computer subsystem of claim 4, wherein said plurality of block-addressable persistent memory devices are made of NAND Flash memory.

6. The computer subsystem of claim 4, wherein said plurality of block-addressable persistent memory devices are made of MRAM.

7. The computer subsystem of claim 4, wherein said byte-addressable persistent memory device is made of MRAM.

8. The computer subsystem of claim 4, wherein said byte-addressable persistent memory device includes multiple partitions with at least one of said multiple partitions being invisible to BIOS during booting.

9. The computer subsystem of claim 1, wherein each of said one or more slave persistent memory modules includes a plurality of block-addressable persistent memory devices for storing data.

10. The computer subsystem of claim 9, wherein said plurality of block-addressable persistent memory devices are made of NAND Flash.

11. The computer subsystem of claim 9, wherein said plurality of block-addressable persistent memory devices are made of MRAM.

12. The computer subsystem of claim 1, wherein said one or more slave persistent memory modules are invisible to BIOS during booting.

13. The computer subsystem of claim 1, wherein said commands include global wear leveling.

14. The computer subsystem of claim 1, wherein said commands include global garbage collection.

15. The computer subsystem of claim 1, wherein data between said CPU and said one or more slave persistent memory modules is transferred via said second memory channel.

16. The computer subsystem of claim 1, wherein said CPU includes a memory controller connected to said first and second memory channels.

\* \* \* \* \*